United States Patent [19]

Amass et al.

[11] 3,884,894

[45] May 20, 1975

[54] OLEFIN POLYMERIZATION

[75] Inventors: Allan John Amass, Southampton; Anthony Vincent Butcher, New Milton; Edward William Duck, Southampton; John Michael Locke, Lyndhurst, all of England

[73] Assignee: The International Synthetic Rubber Co., Ltd., England

[22] Filed: Feb. 26, 1973

[21] Appl. No.: 336,041

[30] Foreign Application Priority Data
Mar. 3, 1972 United Kingdom............... 10188/72
Jan. 11, 1973 United Kingdom................ 1601/73

[52] U.S. Cl.......... 260/93.7; 260/45.85; 260/88.2 R; 260/94.9 C; 260/94.9 CD; 260/94.9 E
[51] Int. Cl. ............................................. C08f 3/02
[58] Field of Search ..... 260/94.9 E, 88.2 R, 94.9 R, 260/94.9 B, 93.7

[56] References Cited
UNITED STATES PATENTS

| | | | |
|---|---|---|---|
| 3,130,003 | 4/1964 | Tornqvist et al. | 260/94.9 E |
| 3,139,419 | 6/1964 | Tornqvist et al. | 260/94.9 E |
| 3,308,112 | 3/1967 | Ludlum | 260/94.9 E |
| 3,482,935 | 12/1969 | Trementozzi et al. | 260/94.9 E |
| 3,575,948 | 4/1971 | Blunt | 260/94.9 E |
| 3,678,025 | 7/1972 | Birrell | 260/94.9 E |
| 3,707,530 | 12/1972 | Calcagno et al. | 260/94.9 E |
| 3,766,158 | 10/1973 | Yamaguchi et al. | 260/94.9 E |

FOREIGN PATENTS OR APPLICATIONS

| | | | |
|---|---|---|---|
| 875,924 | 8/1961 | United Kingdom | 260/94.9 E |
| 1,243,563 | 8/1971 | United Kingdom | 260/94.9 E |
| 698,421 | 11/1964 | Canada | 260/94.9 E |
| 2,130,241 | 6/1971 | Germany | 260/94.9 E |

*Primary Examiner*—Harry Wong, Jr.
*Assistant Examiner*—T. S. Gron
*Attorney, Agent, or Firm*—Cushman, Darby & Cushman

[57] ABSTRACT

Alpha olefins, especially propylene, are polymerized in a hydrocarbon diluent by means of (1) an intimate dispersion of, for example delta titanium trichloride and vanadium oxytrichloride in the mole ratio of preferably 20:1 to 30:1 and (2) an aluminum hydrocarbyl, an aluminum halide hydrocarbyl or a mixture thereof. Polymerization is conveniently effected under a pressure of up to 20 atmospheres and at a temperature of 50° to 80°C. The polymer is preferably recovered as a crumb by injection into hot water.

17 Claims, No Drawings

OLEFIN POLYMERIZATION

This invention relates to the polymerization of olefins, especially to the polymerization of propylene.

It is well known that alpha olefins may be polymerized by means of a catalyst comprising a transition metal compound and an aluminum hydrocarbyl or aluminum hydrocarbyl halide. The transition metal compound used may have a marked effect on the polymerization reaction, influencing, for example, the activity of the catalyst and/or the stereo-structure of the polymer product. For example, in the case of the homopolymerization of propylene, a reaction carried out at $-78°C$ using a soluble vanadium catalyst yields a predominantly syndiotactic polymer. On the other hand, in a similar reaction carried out using violet titanium trichloride and aluminum triethyl or aluminum diethyl chloride, predominantly isotactic polyproplene is obtained in high yield. In practice the product obtained with aluminum diethyl chloride is about 90% isotactic and with aluminum triethyl about 70%, the balance in each case being atactic. The yield in the former case is, however, considerably reduced. In order to produce polypropylene having a high isotacticity (90% or more) using aluminum diethyl chloride as catalyst, it is necessary to remove atactic material by extraction. In addition, the level of catalyst residue in the polymer is desirably as low as possible.

Recently it has been found possible to prepare a polypropylene having about 70% isotactic/30% atactic content in high yield (e.g., 20 Kg. polypropylene per gram of catalyst in 4 hours) by adding a hexane slurry of titanium trichloride and aluminum triethyl to liquid propylene at 90°C and 35 atmospheres pressure. This reduces the cost of production of the polymer and, moreover, catalyst residue removal is not necessary because of the large amount of polymer produced per unit of catalyst. The polypropylene produced by this method is particularly applicable for use in thin films.

We have now found that it is possible to produce a polypropylene very similar to that described in the preceding paragraph at much lower pressures giving an exceptionally high yield (e.g., 35 Kg. of polypropylene per gram of titanium in 2 hours) by employing an intimate dispersion of compounds of two or more different transition metals with an aluminum compound as cocatalyst.

According to the invention we provide a process for the preparation of a polymer of at least one alpha olefin wherein the polyermization is effected in a hydrocarbon diluent by means of a catalyst comprising:

1. an intimate dispersion of
   A. a halide of a metal selected from titanium, zirconium and hafnium and
   B. a compound of a transition metal different from the transition metal used in component A in which the mole ratio of component A to component B is in the range 10:1 to 100:1 and
2. an aluminum compound selected from an aluminum hydrocarbyl, an aluminum hydrocarbyl halide, and a mixture thereof; and the polymer is recovered.

The process is particularly applicable to the polymerization of propylene alone.

The oxidation state of the metal in component A is preferably at least one less than maximum. Preferably a solid halide, such as zirconium trichloride, and particularly a violet titanium halide such as delta $TiCl_3$ (i.e., $TiCl_3 \cdot 1/3 AlCl_3$) is used. Examples of other suitable halides are $TiCl_3$, $TiBr_3$ and $TiI_3$, and halides of other oxidation states of titanium such as $TiCl_2$. If desired the metal halide may be prepared in situ by reduction of a compound of the metal in its maximum oxidation state, e.g., $TiCl_4$ reduced with aluminum.

The compound(s) used as component B in the dispersion is a compound of a transition metal different from the transition metal(s) used in component A. Preferably it is a compound of a transition metal other than a Group IVa metal, for example, vanadium, chromium, molybdenum, tungsten and iron. The compound is preferably a halide or oxyhalide, particular examples being vanadium oxytrichloride, vanadium tetrachloride, vanadyl acetyl acetonate, niobium pentachloride and molybdenum oxytetrachloride.

Desirably component A of the dispersion is solid and component B is desirably a liquid or soluble in the hydrocarbon diluent as, for example, is the case where component A is $TiCl_3$ and component B is vanadium oxytrichloride. The mole ratio of component A to component B is in the range 10:1 to 100:1, preferably 20:1 to 30:1. In the polymerization reaction, component A is preferably present in an amount of 0.01 to 10 millimoles per liter of hydrocarbon diluent, generally at least 0.1 millimoles per liter. The optimum amount of A and B within the range quoted may be determined by simple experiment using various ratios of A and B.

The intimate dispersion of components A and B is prepared by mixing together the components, optionally under conditions of shear. For example, components A and B may be mixed by high speed shear stirring, by ball-milling, colloid milling or rod milling or by passage through a homogeniser.

Preferably the intimate dispersion of components A and B is prepared by ball milling the components together as a 10 to 25% w/v slurry in a hydrocarbon diluent, e.g., hexane or cyclohexane, in the presence of graded steel balls for a period of 2 hours or more. Longer periods, e.g., 12 hours or more, may be required if ball milling in glass with glass balls is used. Advantageously, but not essentially, an alpha-olefin containing 6 or more carbon atoms, e.g., octene or decene is present during the ball milling stage. Desirably the temperature does not exceed 30°C. If an alpha-olefin containing 2 to 5 carbon atoms is included at this stage, e.g., ethylene, this tends to copolymerize with the propylene during the polymerization reaction to an insoluble product.

Polymerization is carried out in a hydrocarbon diluent which is not polymerizable under the polymerization conditions used. Examples of suitable diluents are hexane, cyclohexane and petroleum ether. The diluent is preferably saturated with monomer before contact with the catalyst. Reaction is preferably carried out in the substantial absence of oxygen, moisture and other compounds which may deactivate the catalyst. Preferably the aluminum component (component 2) of the catalyst is added to the monomer(s) and diluent before addition of component 1.

Component (2) of the catalyst is an aluminum hydrocarbyl, an aluminum hydrocarbyl halide or a mixture thereof. Preferably an aluminum hydrocarbyl, such as an aluminum trialkyl in which the alkyl groups have, e.g., 1 to 8 carbon atoms, is used. Aluminum triethyl is preferred. The aluminum hydrocarbyl halide where used, is preferably of formula $AlR'_2X$ (wherein $R' =$ alkyl and X = halogen). Preferably R' in the formulae does not have more than 6 carbon atoms and preferably X is chlorine. Diethyl aluminum chloride is preferred. Another aluminum hydrocarbyl halide which may be used is ethyl aluminum sesquichloride.

A mixture of two or more aluminum alkyls (e.g., triethyl and triisobutyl) may be used if desired. The proportion of crystalline polymer may be increased by using a mixture of a trialkyl and an aluminum alkyl halide. For example polymerization may be started using a portion of trialkyl then ethyl aluminum sesquichloride may be added. This increases the catalyst-:aluminum ratio and at the same time produces an Al:Cl ratio known to give increased isotacticity. Variation of the number of carbon atoms in the alkyl radicals affects the yield and the isotacticity of the resultant polymer. Generally aluminum triethyl gives a product of highest isotacticity when used for the polymerization of propylene alone.

Preferably the molar ratio of component (2) of the catalyst to component A is at least 0.1:1, e.g., 0.5:1 to 20:1 and more preferably is in the range 0.8:1 to 3:1.

The pressure at which the polymerization is effected is conveniently up to 20 atmospheres (300 p.s.i), e.g., 8 to 10 atmospheres, although higher pressures e.g., up to 50 atmospheres (700 p.s.i) may be used if desired.

Polymerization may be carried out at a temperature of, e.g., 20°C, but is most effective when carried out at elevated temperature, e.g., 50° to 90°C. However in the case of polymerization of propylene alone, the temperature at which the catalyst components are contacted with the propylene and diluent is preferably lower than 50°C, preferably about 20°C. The temperature is preferably not increased to the polymerisation temperature immediately on formation of the polymerization mixture, a delay of several minutes, e.g., 4 to 10 minutes, being desirable.

If ethylene is used instead of propylene, even in only small amounts, this procedure is not necessary and the catalyst components may be contacted with the ethylene and diluent at the polymerization temperature and then polymerization with propylene commenced. Thus using this procedure, raising the temperature to the polymerization temperature is not required.

Polymerization takes place very rapidly because of the high activity of the catalyst. It may be carried out even beyond the stage where the fluid properties of the slurry disappear and a granular product crumb is formed, since the crumb retains a high activity. Therefore polymerization times of 5 to 6 hours are easily attainable.

If desired, controlled amounts of hydrogen, water or an alcohol may be used during polymerization to control the molecular weight (melt index) of the polymer product.

The polymer product may be recovered in several ways. For example the reaction may be short-stopped using, e.g., an alcohol, water or an amine, and the polymer precipitated with an oxygen-containing solvent such as methanol, ethanol or acetone. Alternatively, where separation of the isotactic and atactic portions of the product is desired, the product can be extracted with a hot solvent for one fraction (e.g., hexane), followed by evaporation of the solvent after separation. A preferred procedure, especially where a product containing both isotactic and atactic fractions is desired, is to form a crumb from the polymerization mixture, without short-stopping, by injection with agitation into hot water. This procedure may also be used to recover the isotactic or atactic fractions after extraction as referred to above.

In the case of polymerization of propylene alone, the product before separation is a polypropylene having about 70% isotactic/30% atactic fractions which is ideal for the formation of films. There is a mild tendency to discolor on heating which can be avoided by the introduction of a metal soap such as a Group I or II metal salt, for example, calcium or potassium stearate. In addition an antioxidant, particularly a thio dipropionate, for example di lauryl thio dipropionate or distearyl thio dipropionate may be used with advantage. These additive compounds are desirably very intimately mixed with the polymer product. This may be carried out in the polymerization reactor or in the crumbing process or by blending with the recovered polymer product. In the latter case it is preferred to blend in the additive compounds at or above the temperature at which homogeneity of the atactic and isotactic phases occurs, i.e., the flux temperature.

The atactic portion of the polymer product is an unusual material, differing from previously prepared atactic polypropylene. It is soluble in hot hexane and of low crystallinity. On stretching beyond the yield point, the polymer crystallizes and becomes a strong elastomer which can be compounded and cured with, e.g., peroxides, in the usual manner. It is of very high molecular weight, nearly all above 10,000.

The distribution of molecular weights is very even and very wide giving an unusually shallow and flat molecular weight distribution curve. About half (by number) is above 100,000 molecular weight. The unfractionated material (i.e., isotactic/atactic mixture) has great clarity and strength and it is therefore ideal for use in films.

The process may be used for the polymerization of ethylene or alpha-olefins having 3 to 10 carbon atoms, especially propylene and mixtures of such alpha-olefins with each other and/or with ethylene. The process is particularly effective for the polymerization of propylene alone, especially where the catalyst components are delta titanium trichloride (1A), vanadium oxytrichloride (1B) and aluminum triethyl (2).

Optionally a halogenated organic compound may be included in the reaction medium, in a molar ratio: transition metal in component (A2) of, e.g., 10:1 to 1:10. Preferably such a compound contains at least two, and more preferably three, halogen atoms attached to a carbon atom, especially where the halogen atoms are activated by an adjacent electron donor group such as carbonyl, carboxyl, amine or amino group and/or by one or more carbon-carbon double bonds. Compounds wherein the halogen is chlorine are particularly suitable, especially perchloro compounds in which there is an additional functional group (e.g., carbonyl). An ester of a perchlorinated organic acid, such as ethyl trichloroacetate, or butyl perchlorocrotonate, is very effective.

The following Examples illustrate the invention:

EXAMPLE 1

$\delta TiCl_3$ (36 g. 181 mmole of Ti) was dispersed in dearomatized hexane and 6.8 ml. of a 10% (v/v) solution of $VOCl_3$ (7.24 mmole) was added. The total volume was 181 ml. The mixture was ball milled for 18 hours at 15°C to produce a violet dispersion or slurry which was 1 Molar with respect to titanium and 0.04 Molar with respect to vanadium [Ti:V ratio 25:1].

0.8 ml. (1mmole) of a 20% solution of aluminum triethyl in dearomatized hexane was added to 500 ml. of petroleum ether atmospherically saturated with propylene at 25°C followed by 1.0 ml. (1 mmole of Ti) of the slurry prepared as above. Immediately the temperature was raised to 80°C and polymerization carried out for 2 hours. During this time propylene was added continuously and the reaction was terminated by the addition of methanol (5 ml.). The polymer was isolated by mixing the product with acetone and subsequent filtration. 49.0 g. of white polypropylene was obtained which is equivalent to a catalyst "mileage" of 415 grams per gram of titanium.

EXAMPLES 2 TO 7

Example 1 was repeated except that the amount of aluminum triethyl added was varied as shown with the results (including Ex. 1) in the table.

|   | Vol. of AlEt$_3$ | mmoles AlEt$_3$ | V : Ti : Al | Yield g | g/g Ti |
|---|---|---|---|---|---|
| 1 | 0.8 | 1.0 | 4 : 100 : 100 | 49.0 | 1030 |
| 2 | 1.6 | 2.0 | 4 : 100 : 200 | 52.3 | 1100 |
| 3 | 2.4 | 3.0 | 4 : 100 : 300 | 41.9 | 865 |
| 4 | 3.2 | 4.0 | 4 : 100 : 400 | 39.4 | 828 |
| 5 | 4.0 | 5.0 | 4 : 100 : 500 | 47.2 | 991 |
| 6 | 4.8 | 6.0 | 4 : 100 : 600 | 39.9 | 838 |
| 7 | 5.6 | 7.0 | 4 : 100 : 700 | 29.0 | 609 |

EXAMPLES 8 TO 15

Example 2 was repeated except that various volumes of a 0.01 Molar solution of ethyl trichloroacetate (ETCA) in hexane were added after addition of the catalyst slurry, the amounts used being given with the results in the table below:

|   | Vol. of 0.01M ETCA | mmoles ETCA ×10$^2$ | ETCA:V:Ti:Al | Yield g | g/g Ti |
|---|---|---|---|---|---|
| 8 | 0.5 | 0.5 | 1:8:200:400 | 52.7 | 1110 |
| 9 | 1.0 | 1.0 | 1:4:100:200 | 55.2 | 1160 |
| 10 | 1.5 | 1.5 | 3:8:200:400 | 47.9 | 1040 |
| 11 | 2.0 | 2.0 | 2:4:100:200 | 51.7 | 1085 |
| 12 | 3.0 | 3.0 | 3:4:100:200 | 49.9 | 1048 |
| 13 | 4.0 | 4.0 | 4:4:100:200 | 47.8 | 1004 |
| 14 | 5.0 | 5.0 | 5:4:100:200 | 46.7 | 980 |
| 15 | 6.0 | 6.0 | 6:4:100:200 | 45.8 | 965 |

EXAMPLES 16 TO 19

Example 2 was repeated, the polymerization time being varied to study the effect on yield. The times used and results obtained are given in the table, the results of Ex. 2 being included for reference.

| Ex. | Time (hr) | Yield (g) | g/g Ti |
|---|---|---|---|
| 16 | 1 | 33.8 | 710 |
| 2 | 2 | 55.2 | 1160 |
| 17 | 3 | 59.4 | 1250 |
| 18 | 4 | 70.7 | 1490 |
| 19 | 5 | 76.8 | 1610 |

Thus, it can be seen that the catalyst is active in polymerization for long periods.

EXAMPLE 20

δ-TiCl$_3$ (36 g. 181 mmole of Ti) was dispersed in dearomatized hexane (180 ml) and 1.7 ml. of a 10% (v/v) solution of VOCl$_3$ (1.81 mmole) was added. The mixture was ball-milled for 18 hours at 15°C to produce a violet dispersion or slurry which was 1 Molar with respect to titanium and 0.01 Molar with respect to vanadium [Ti:V ratio = 100:1].

1 ml. of a 20% solution of aluminum triethyl (1.25 mmole Al) in dearomatized hexane was added to petroleum ether (500 ml.) atmospherically saturated with propylene at 50°C. 1.25 ml. of the slurry was added to the hexane [V:Ti:Al = 1:100:100].

Polymerization of propylene was carried out for 2 hours, propylene being added continuously. The reaction was terminated by the addition of methanol (5 ml) and the polymer isolated as before. 25 g. of white polypropylene was obtained (415 grams per gram of titanium).

EXAMPLE 21

Example 20 was repeated except that 4.05 ml. of a 0.2% v/v solution of butyl perchlorocrotonate in hexane was added after addition of the catalyst slurry [V:promoter ratio 1:3]. The yield of polymer was 44.8 g. (750 g/g of Ti).

EXAMPLE 22

Example 21 was repeated except that the polymerization temperature was 80°. Yield was 52.0 g (875 g/g of Ti).

EXAMPLE 23 (FOR COMPARISON)

Example 20 was repeated except that titanium trichloride (1.25 mmole) was used in place of the titanium/vanadium slurry described in that example. Only 12.8 g. of polypropylene was obtained (yield g/g of Ti=207).

EXAMPLE 24

A 1-gallon stainless steel reactor fitted with a stirrer was heated to 120°C, purged with nitrogen for 1 hour and charged with 3 liters of hexane. This was heated to 40°, purged with nitrogen four times and saturated with propylene. 5 ml. of a 20% solution of aluminum triethyl (6.25 mmole Al) in hexane was added followed by 0.4 ml. (0.32 mmole Ti) of the slurry described in Example 20. The reactor was pressurized to 70 psig with propylene and heated to 90°C by an external electric heater. The pressure was adjusted to 120 psig by further addition of propylene and this temperature and pressure were maintained for 2 hours. 535 g. polypropylene were obtained. (35.0 Kg. polypropylene/gm. titanium).

EXAMPLE 25

Example 24 was repeated except that ethylene was used to saturate the hexane at 40° instead of propylene. 502 g. polypropylene were obtained. (32.8 Kg. polypropylene/gm. titanium).

EXAMPLE 26

Example 25 was repeated, except that the VOCl$_3$ was omitted. 189 g. polypropylene were obtained. (12.3 Kg. polypropylene/gm. titanium).

EXAMPLE 27

Example 2 was repeated except that the temperature was raised to 80°C over 10 minutes. Polymerization was carried out for 2 hours as before. 52.3g. of white polypropylene was obtained which is equivalent to a catalyst mileage of 1,100g/g titanium. 69% of the polypropylene was insoluble in boiling heptane.

EXAMPLES 28 TO 32

Example 27 was repeated except that the time taken to raise the temperature to 80°C was varied as shown below.

| Ex. | Time Taken (mins) | Yield | Appearance of polymer |
|---|---|---|---|
| 27 | 10 | 52.3 | soft, granular |
| 28 | 5 | 54.1 | soft, granular |
| 29 | 4 | 48.3 | soft, granular |
| 30 | 3 | 46.7 | harder, lumpy |
| 31 | 2 | 44.3 | hard, stringy |
| 32 | 1 | 42.6 | hard, stringy |

EXAMPLE 33

Example 27 was repeated except that 2mmole of aluminum diethyl chloride were added when the mixture reached 80°C. The yield was 34g of polypropylene, 82% of which was insoluble in boiling heptane.

EXAMPLE 34

Example 27 was repeated except that the solvent was saturated atmospherically with ethylene at 80°C and the catalyst was added at this temperature. Ethylene was bubbled in for 30 secs then the mixture was purged with nitrogen for 30 secs. Propylene was then bubbled in for the 2 hour polymerization period. 51 g. of soft granular polymer were obtained.

EXAMPLE 35

Example 24 was repeated except that 1 ml of a 20% solution of aluminum triethyl (1.2 mmole Al) in hexane was used followed by 0.3 ml (0.3 mmole Ti) of the slurry described in Example 1. After deactivation of the catalyst, 501 g polypropylene were recovered by a hot water work-up stage (35.0 Kg polypropylene per gm. titanium). The melt flow index (230°C 2.16kg) was 1.0, and 70% was insoluble in boiling heptane.

Injection moulded samples of the product were off-white in color. Stirring in 0.2% by weight of calcium stearate and 0.1% by weight of distearyl thio dipropionate at the end of the polymerization before catalyst deactivation gave a product which on injection moulding was completely color free with no surface tackiness.

EXAMPLE 36

Example 35 was repeated except that hydrogen at a partial pressure of 1 p.s.i. was introduced into the reactor immediately after the addition of the catalyst components. 429g of polypropylene was recovered. The melt flow index was 13.0 and 50% was insoluble in boiling heptane.

By the term "transition metal" as used in this specification, including the claims, we mean a metal of Groups IVa, Va, VIa, VIIa, VIII, Ib, and IIb of the Periodic Table as set forth on Page 30 of "Advanced Inorganic Chemistry" by F. A. Cotton and G. Wilkinson, published by Interscience Publishers, 1962.

Preferably component B is a compound of a Group Va, VIa, or VIIa metal.

What we claim is:

1. A process for the preparation of a homopolymer of propylene wherein the polymerization is effected in a hydrocarbon diluent by means of a catalyst comprising:
    1. An intimate dispersion of:
        A. titanium trichloride, and
        B. a compound of a transition metal selected from the group consisting of vanadium oxytrichloride, vanadium tetrachloride, vanadyl acetyl acetonate, niobium pentachloride and molybdenum oxytetrachloride in which the mole ratio of component A to component B is in the range 10:1 to 100:1, said intimate dispersion 1 having been prepared by ball milling for at least 2 hours component A with component B and
    2. An aluminum compound selected from the group consisting of an aluminum hydrocarbyl, an aluminum hydrocarbyl halide and a mixture thereof; and recovering the polypropylene.

2. A process according to claim 1 wherein component A is delta titanium trichloride.

3. A process according to claim 1 wherein the mole ratio of component A to component B is in the range 20:1 to 30:1.

4. A process according to claim 1 wherein the intimate dispersion, 1, is prepared by ball milling component A with component B as a slurry for a period of at least 2 hours at a temperature of up to 30°C.

5. A process according to claim 1 wherein component 2 of the catalyst is selected from an aluminum trialkyl having 1 to 8 carbon atoms, an aluminum alkylhalide in which the alkyl has 1 to 6 carbon atoms and a mixture thereof.

6. A process according to claim 5 wherein the molar ratio of component 2 to component A is 0.5:1 to 20:1.

7. A process according to claim 1 wherein propylene is polymerized alone and the polymerization is effected at a temperature of 50° to 90°C.

8. A process according to claim 7 wherein the catalyst components are contacted with the propylene and the diluent at a temperature of up to 50°C. and the temperature is gradually increased to the polymerization temperature over a period of at least 4 minutes.

9. A process according to claim 1 wherein the catalyst components are contacted with ethylene and the diluent at the polymerization temperature before the polymerisation with propylene is commenced.

10. A process according to claim 1 wherein polymerization is effected under a pressure of up to 50 atmospheres.

11. A process according to claim 10 wherein the polymerization pressure is up to 20 atmospheres.

12. A process according to claim 1 wherein the polymer is recovered as a crumb by injection into hot water without shortstopping.

13. A process for the preparation of polypropylene comprising polymerizing propylene in a hydrocarbon diluent, not polymerizable under the polymerization conditions used, at a temperature of 50° to 90°C and under a pressure of atmospheric pressure to 20 atmospheres by means of a catalyst comprising:

1. an intimate dispersion of A delta titanium trichloride and B a transition metal compound selected from vanadium oxytrichloride, vanadium tetrachloride, vanadyl acetonate, niobium pentachloride and molybdenum oxytetrachloride in the mole ratio of component A to component B of 20:1 to 30:1 and prepared by ball milling the components as a slurry for a minimum period of two hours, and
2. an aluminum compound selected from an aluminum alkyl, an aluminum alkyl halide and a mixture thereof, component 2 being added to the propylene and diluent before the addition of component 1; and thereafter recovering the polypropylene formed.

14. A process according to claim 13 wherein the pressure is 8 to 15 atmospheres.

15. A process according to claim 1 wherein the transition metal compound is vanadium oxytrichloride.

16. A process according to claim 15, wherein the titanium trichloride is delta-titanium trichloride.

17. A process according to claim 16 wherein 2 is aluminum triethyl.

* * * * *